United States Patent
Schoemann et al.

(10) Patent No.: US 7,670,524 B2
(45) Date of Patent: Mar. 2, 2010

(54) METHOD OF OVER-MOLDING TPE COMPONENTS USING ZERO GATE

(75) Inventors: Michael P. Schoemann, Waterford, MI (US); Raymond Cummins, Wixom, MI (US); Kenneth Jarzynski, Auburn Hills, MI (US)

(73) Assignee: International Automotive Components Group North America, Dearborn, MI (US)

( * ) Notice: Subject to any disclaimer, the term of this patent is extended or adjusted under 35 U.S.C. 154(b) by 1215 days.

(21) Appl. No.: 10/852,346

(22) Filed: May 24, 2004

(65) Prior Publication Data

US 2005/0258569 A1 Nov. 24, 2005

(51) Int. Cl.
*B29C 45/14* (2006.01)
*B29C 45/16* (2006.01)

(52) U.S. Cl. ............... 264/255; 264/328.7; 264/328.8; 264/273; 264/274

(58) Field of Classification Search ............... None
See application file for complete search history.

(56) References Cited

U.S. PATENT DOCUMENTS

| | | | |
|---|---|---|---|
| 4,104,357 A | 8/1978 | Blair | |
| 4,183,883 A | 1/1980 | Blair | |
| 4,444,711 A | 4/1984 | Schad | |
| 4,676,941 A * | 6/1987 | Shiho et al. | 264/247 |
| 4,822,549 A | 4/1989 | Verwilst et al. | |
| 5,071,683 A | 12/1991 | Verwilst et al. | |
| 5,094,602 A * | 3/1992 | Morita | 425/130 |
| 5,916,643 A | 6/1999 | Spain et al. | |
| 6,352,658 B1 | 3/2002 | Chang et al. | |
| 6,368,536 B1 | 4/2002 | Hoepfl et al. | |
| 6,413,460 B1 * | 7/2002 | Wisniewski et al. | 264/254 |
| 7,070,724 B2 * | 7/2006 | Nakazawa | 264/250 |
| 7,108,825 B2 * | 9/2006 | Dry et al. | 264/328.7 |
| 2003/0222373 A1 | 12/2003 | Payette et al. | |
| 2004/0003908 A1 | 1/2004 | Singh et al. | |

FOREIGN PATENT DOCUMENTS

| GB | 2403449 A | 1/2005 |
|---|---|---|
| GB | 2 409 430 A | 6/2005 |

\* cited by examiner

*Primary Examiner*—Edmund H. Lee
(74) *Attorney, Agent, or Firm*—Brooks Kushman P.C.

(57) ABSTRACT

The present invention provides a method for molding an over-molded part by a multi-shot molding method. The method of the invention comprises combining a first mold section having one or more retractable tool portions and a second mold section to form a first mold cavity. A first thermoplastic resin is injected into a first mold cavity to form a first molded part. Subsequently, the second mold section is separated from the second mold section such that the first molded part remains in contact with the first mold section. The retractable tool portion is retracted to expose one or more channels. Next, a third mold section is combined with the first mold section to form a second mold cavity. A second thermoplastic resin is then injected into the second mold cavity to form the over-molded part which may then be removed from the mold section. The present invention also provides a method in which a first mold section having one or more retractable tool portions is combined with a second mold section also having one or more tool sections. Finally, the present invention also provides a molding apparatus which executes the methods of the invention.

10 Claims, 3 Drawing Sheets

METHOD OF OVER-MOLDING TPE COMPONENTS USING ZERO GATE

BACKGROUND OF THE INVENTION

1. Field of the Invention

In at least one aspect, the present invention relates methods and equipment for forming an over-molded component, and in particular, to methods and equipment for forming an over-molded component with regions that are difficult to access.

2. Background Art

Multishot molding is a type of injection molding process in which a plastic part having several different colors or several different resins is formed. For example, in two shot molding a plastic part is formed from two different materials. This process is easily automated and able to produce success parts such as buttons and gear wheels with a firm core yet a soft feel. Although multi-material molding is a relatively new molding technology in the United States, it has been popular in Europe for a number of years. Multishot molding is particularly useful for hard and soft combinations of resins, multicolored components, housing or connectors with seals or gaskets, grips and tactile applications, back-lit graphics, weatherproofing, and vibration reduction.

In the typical two shot method, a first resin is injected into the molding apparatus to form a pre-molded part. Next, a second unit injects a second resin onto the premolded part. Typically, the two shot process is automated to form articles having different combinations of resins or colors. Although the two shot process works well, problems occur when it is necessary to over-coat (i.e., over mold) isolated regions in the first resin with the second resin. Such isolated regions occur in a part such as a vehicle console panel when ridges in the part isolate a tray or other recess in the console.

Accordingly, there is a need for two shot molding processes in which isolated regions in a molded part can be overcoated with a second resin.

SUMMARY OF THE INVENTION

The present invention solves one or more problems of the prior art by providing in one embodiment a method of forming an over-molded part by a multishot process. The method of the invention may be used to form a member of plastic parts, which include for example, door latch bezel outers, instrument panel bezels, instrument panel center stack bezels, door panel coin holders, instrument panel tray mats, center console mats, duct work seals, window seals, instrument panel cluster liners, steering wheel shaft liner, logo (or writing) and coin mats. The method of the invention comprises combining a first mold section and a second mold section to form a first mold cavity. The first mold section is characterized by having a first molding surface and one or more retractable tool portions. Similarly, the second mold section is characterized by having a second molding surface. Together, the first molding surface and the second molding surface define the first mold cavity. After the first molding cavity is formed, a first thermoplastic resin is injected into a first mold cavity at a sufficient temperature and pressure to fill the first mold cavity and form a first molded part. After the first molded part is formed, the second mold section is separated from the first mold section such that the first molded part remains in contact with the first molding surface. The retractable tool portion is then retracted away from the first molding surface to expose one or more channels defined by the top of the retractable tool portion, any exposed surface of the first mold section and the first molded part. Next, a third mold section is combined with the first mold section to form a second mold cavity. The second mold cavity is defined by the first molded part, exposed surfaces of the first molding surface, and the third molding surface. A second thermoplastic resin is then injected into the second mold cavity at a sufficient temperature and pressure to fill the second mold cavity and form the over-molded part which may then be removed from the mold section.

In another embodiment of the present invention, a second method of forming an over-molded part is provided. The method of the invention comprises combining a first mold section and a second mold section to form a first mold cavity. In this embodiment, the first mold section has a first molding surface and one or more first mold section retractable tool portions, and the second mold section has a second molding surface and one or more second mold section retractable tool portions. In a similar fashion as set forth above, the first molding surface and the second molding surface define a first mold cavity. After the first mold cavity is formed, a first thermoplastic resin is injected into the first mold cavity at a sufficient temperature and pressure to fill the first mold cavity and form a first molded part. After the first molded part is formed, the first mold section retractable tool portion is retracted in a direction away from the first molding surface to expose one or more channels defined by the first mold section and the first molded part. Similarly, the second mold section retractable tool portion is retracted in a direction away from the second molding surface to expose one or more cavities defined by the second mold section and the first molded part. Together, one or more cavities define a second mold cavity. Next, a second thermoplastic resin is injected into the second mold cavity at a sufficient temperature and pressure to fill the second mold cavity and form the over-molded part.

In yet another embodiment of the invention, a molding apparatus executes the method set forth above is provided. The molding apparatus of the invention includes a first molding section with one or more retractable tool portions. In a first variation, the molding apparatus further includes a second mold section which is combined with the first mold section to form a first mold cavity. The second mold cavity is replaceable with a third mold cavity which together with the first mold section forms a second mold cavity. In a second variation, the molding apparatus further includes a second mold section which also has one or more retractable tool portions.

DETAILED DESCRIPTION OF THE PREFERRED EMBODIMENT(S)

Reference will now be made in detail to presently preferred compositions or embodiments and methods of the invention, which constitute the best modes of practicing the invention presently known to the inventor.

Figure 1:
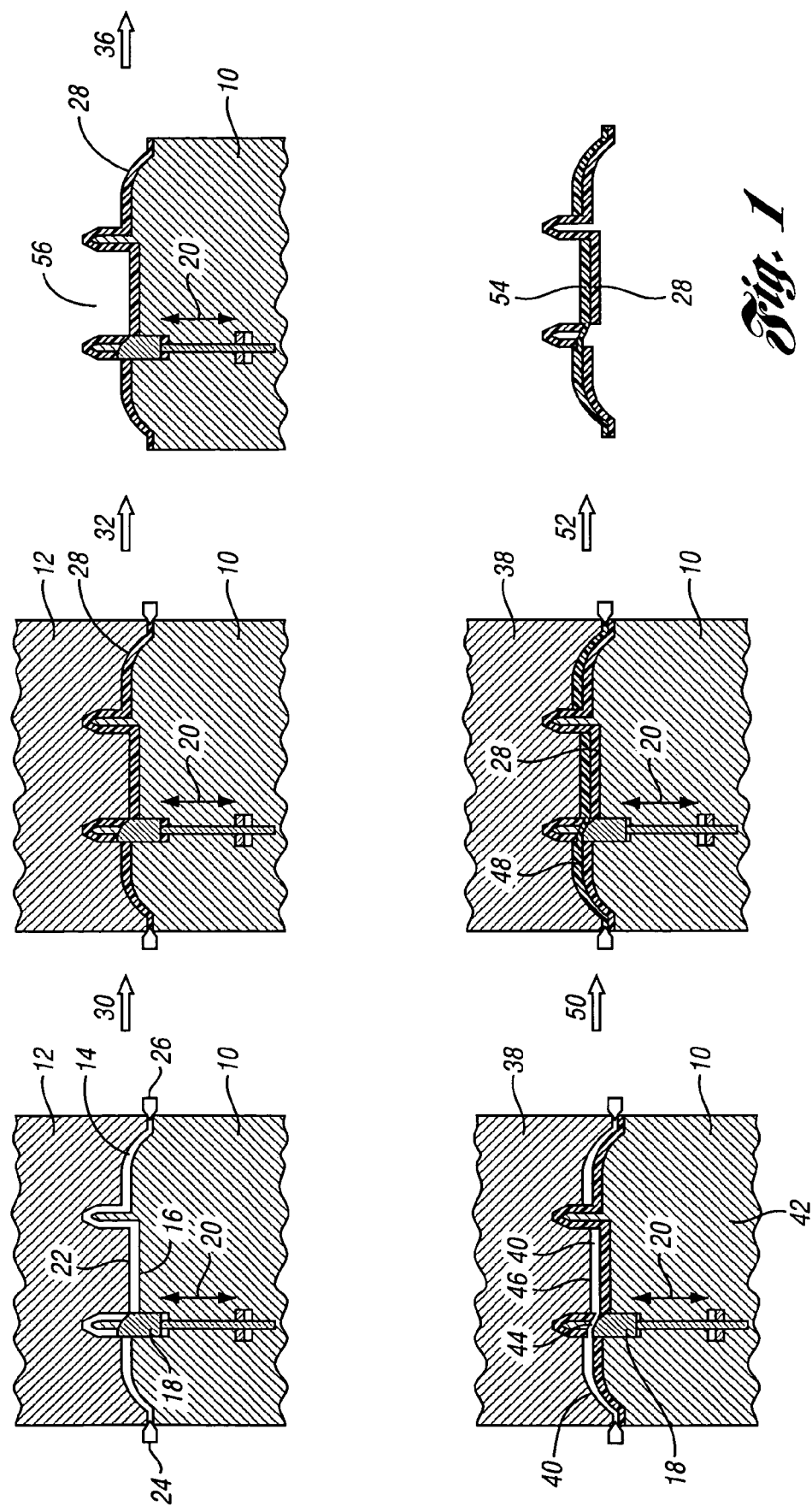
FIG. 1 is a diagram illustrating the molding of an over-molded part by the method of the invention in which a first molding section has one or more retractable tool portions.

In an embodiment of the present invention, a method of forming an over-molded part is provided. With reference to FIG. 1, first mold section 10 is combined with second mold section 12 to form first mold cavity 14. First mold section 10 includes first molding surface 16. First mold section 10 also includes one or more retractable tool portions 18. Retractable tool portions 18 is translatable along direction 20. Similarly, second mold section 12 includes second molding surface 22. First mold cavity 14 is defined by first molding surface 16 and second molding surface 22. A first thermoplastic resin is injected into first mold cavity 14 through one or more gates 24, 26 at a sufficient temperature and pressure to fill first mold cavity 14 and form first molded part 28 as indicated in step 30. Typically, the first thermoplastic resin is injected into the first mold cavity at a temperature from about 350° F. to about 440° F. and a pressure from about 700 psi to about 2100 psi. Suitable examples of resins that may be used for the first thermoplastic resin include homopolymers and copolymers of polyethylene, homopolymers and copolymers of polypropylene, polycarbonate, acrylonitrile butadiene styrene, mixed acrylonitrile butadiene styrene and polycarbonate, and combinations thereof.

Still referring to FIG. 1, after the thermoplastic resin has been injected into first mold cavity 14, second mold section 12 is separated from first mold section 10 as indicated in step 32. After separation, first molded part 28 remains in contact with first molding surface 16. Prior to separating the first mold section 10 and second mold section 12 the pressure and temperature of the first mold cavity are optionally allowed to decrease. In step 36, third mold section 38 is combined with first mold section 10 to form second mold cavity 40. At least one of the one or more retractable tool portions 18 are retracted along direction 20 away from first molding surface 16 and toward core 42 of first molding section 10 to expose one or more channels 44 defined by the top of retractable tool portion 18 and first molded part 28. Second mold cavity 40 is defined by first molded part 28, the top of retractable tool part 18, any exposed surfaces of first molding surface 16, and third molding surface 46. A second thermoplastic resin is injected into second mold cavity 40 at a sufficient temperature and pressure to fill second mold cavity 40 and form over-molded part 48 as indicated in step 50. Typically, the second thermoplastic resin is injected into the second mold cavity at a temperature from about 390° F. to about 460° F. and a pressure from about 900 psi to about 1700 psi. Suitable examples of resins that may be used for the second thermoplastic resin include thermoplastic elastomers, styrene-ethylene-butylene-styrene elastomers, blocked copolymer thermoplastic elastomers, polyolefin-based elastomers, foamed thermoplastic elastomers, and combinations thereof. First mold half 10 and third mold section 38 are separated, and over-molded part 48 removed as indicated in step 52. Over-molded part 48 comprises second molded part 54 attached to first molded part 28. First molded part 28 may include one or more isolated areas such as isolated area 56. The methods of the present invention are particularly well suited for over-molding such isolated regions. In over-coating an isolated area, one or more channels 44 define one or more openings for introducing the second thermoplastic resin into isolated area 56.

With reference to FIG. 1, retractable tool section 18 during the practice of the invention defines one or more channels 44 which in turn define a runner and gate system that may be used to introduce the second resin. Typically, such a formed gate has a width from about 2 mm to 10 mm, a height from about 2 to 10 mm, and a length less than about 125 mm. Moreover, the height of the gate typically tapers down to about 0.25 mm to about 2 mm. The shape of the gate and runner system is formed because the angle at which retractable tool portion 18 is retracted (relative to a horizontal plane) differs substantially from the angle at the surface of retractable tool portion 18 (i.e, the angle between a tangent plane to the surface and a horizontal plane). Moreover, the angle at the surface of retractable tool portion 18 may vary over the surface when defining the gate and runner system. Moreover, the runner and gate system is such that the velocity of the second thermoplastic resin increases in the runner and gate system when compared to the velocity prior to entering the runner and gate system. It should also be appreciated that the rate of heat loss of the second resin may need to be reduced prior to entering the runner and gate system or while in the runner and gate system. Similarly, it may also be necessary to increase the injection pressure when the second resin enters the runner and gate system.

Figure 2:
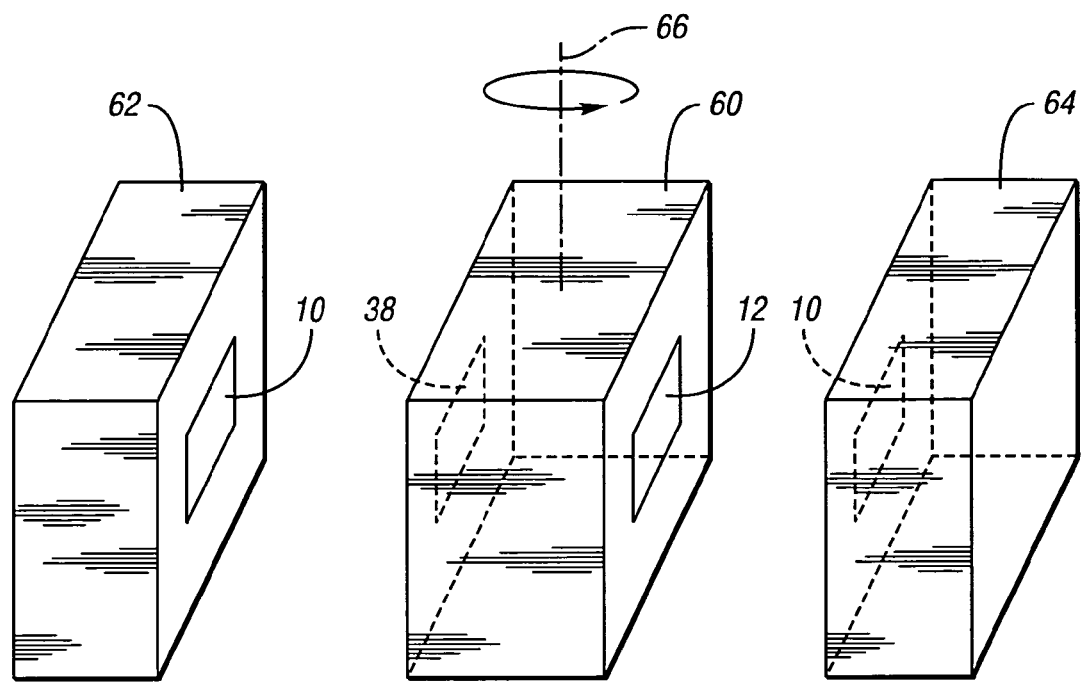
FIG. 2 is a diagram illustrating the molding of an over-molded part by the method of the invention in which a first molding section has one or more retractable tool portions and a second molding section has one or more retractable tool portions.
Figure 3:
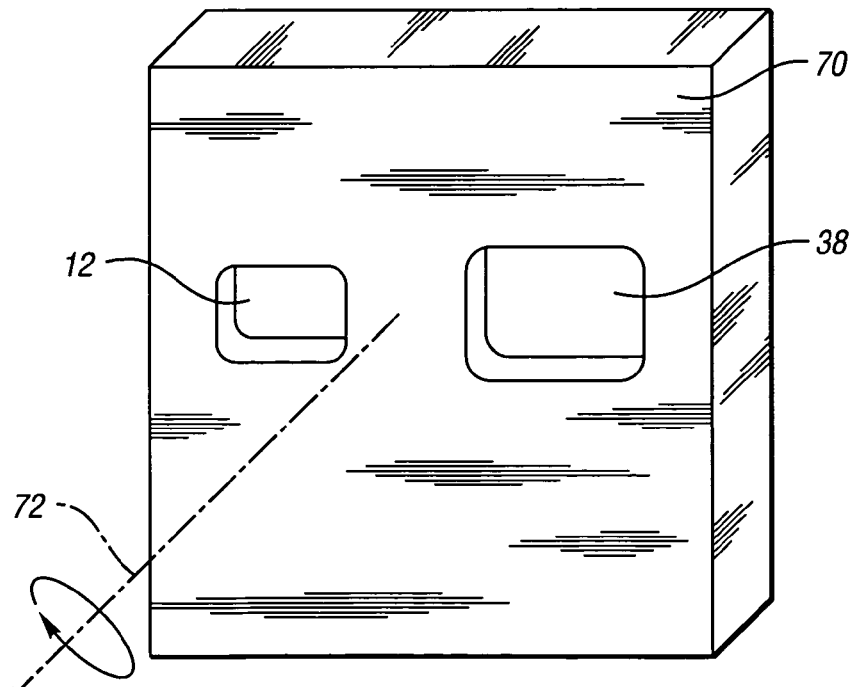
FIG. 3 is a perspective view of a set of molding sections that are rotated while implementing the method of the present invention.

There are a number of different methods by which second molding section 12 may be replaced with third molding section 38. For example, after second section 12 is removed from first mold section 10, the second mold section 12 may be robotically translated away and third mold section robotically translated in place. Alternatively, second mold section 12 may be replaced by third mold section 38 by rotation. FIGS. 2 and 3 provide illustrations that use rotation to replace the mold sections. With reference to FIG. 2, compound molding section 60 includes second mold section 12 and third mold section 38 on opposite faces. In this arrangement components 62, 64 each include an instance of first mold section 10. Accordingly, switching of second mold section 12 with third mold section 38 occurs in this variation of rotation about axis 66. In another variation, rotation occurs in a dial-like manner. With reference to FIG. 3, compound molding section 70 includes both second mold section 12 and third mold section 38 on the same face. In this variation, rotation is in a dial-like manner about axis 72.

Figure 4:
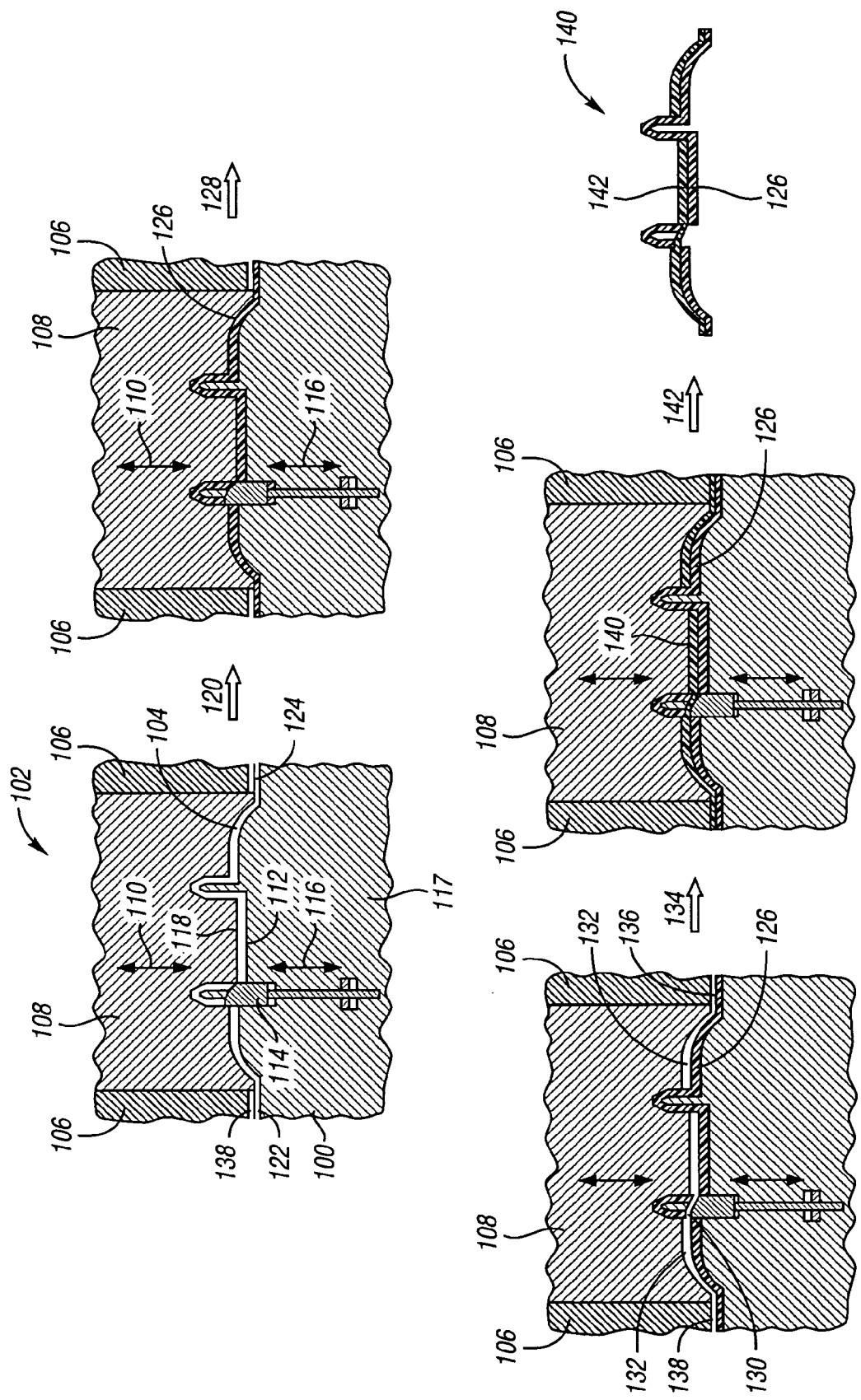
FIG. 4 is a perspective view of a set of molding sections that are rotated in a dial-like manner while implementing the method of the present invention.

In another embodiment of the invention, a second method of forming an over-molded part is provided. With reference to FIG. 4, first mold section 100 and second mold section 102 are combined together to form first mold cavity 104. Second molding section 102 includes a stationery portion 106 and second mold section retractable tool portion 108. Second mold section retractable tool portion 108 is movable in direction 110. First mold section 100 has first molding surface 112 and one or more first mold section retractable tool portions 114 that are retractable in direction 116 towards core section 117. Similarly, second mold section 102 has second molding surface 118. In step 120, a first thermoplastic resin is injected into first mold cavity 104 through runner channels 122, 124 at a sufficient temperature and pressure to fill the first mold cavity and form first molded part 126.

Still referring to FIG. 4, in step 128, second mold section retractable tool portion 108 is retracted in a direction 110 away from the first molding surface 112 to expose one or more channels 130. Similarly, second mold section retractable tool portion 108 is retracted in a direction away from second molding surface 116 to expose second mold cavity 132 defined by second mold section 102 and first molded part 120. In step 134, a second thermoplastic resin is injected into the second mold cavity 132 through runner channels 136, 138 at a sufficient temperature and pressure to fill the second mold cavity and form over-molded part 140. In step 142, over-molded part 140 is removed. Over-molded part 140 comprises second molded part 142 attached to first molded part 126.

In another embodiment of the present invention, a molding apparatus which utilizes the method of the invention is provided. With reference to FIG. 1, the molding apparatus of the invention includes a first mold section 10 that has first core section 42 and a first molding surface 16. The molding apparatus further includes one or more retractable first mold section tool portions 18 within first mold section 10. Retractable tool portions 18 are retractable away from the first molding surface 16.

In a first variation of this embodiment, the molding apparatus further includes second mold section 12 which is combined with first mold section 10 to form first mold cavity 14. Moreover, the one or more retractable tool portions 18 are adapted to be retracted to form one or more channels 44 after a thermoplastic resin is injected into first mold cavity 14.

With reference to FIG. 4, a second variation of this embodiment is provided. The molding apparatus of this variation includes a first mold section 100 that has first core section 117 and a first molding surface 112. The molding apparatus further includes one or more retractable first mold section tool portions 114 within first mold section 100. Retractable first mold section tool portions 114 are retractable away from first molding surface 112. The molding apparatus further includes second mold section 102 that has first molding surface 118 and second mold section retractable tool portion 108 within second mold section 102. Second mold section 102 is adaptable to be combined with the first mold section to form a mold cavity. Again, the one or more retractable first mold section tool portions 114 are adapted to be retracted to form one or more channels 130 after a thermoplastic resin is injected into the first mold cavity and the one or more retractable second mold section portions 108 are adapted to be retracted to form one or more cavities 132 after a thermoplastic resin is injected into the first mold cavity.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of forming an over-molded part, the method comprising:
   combining a first mold section and a second mold section to form a first mold cavity, the first mold section having a first molding surface and a retractable tool portion and the second mold section having a second molding surface wherein the first mold cavity is defined by the first molding surface and the second molding surface, the retractable tool portion having a retractable tool surface;
   injecting a first thermoplastic resin into a first mold cavity at a sufficient temperature and pressure to fill the first mold cavity and form a first molded part;
   separating the second mold section from the first mold section such that the first molded part remains in contact with the first molding surface;
   retracting the retractable tool portion at an angle with respect to a horizontal plane in a direction away from the first molding surface to expose one or more channels such that the angle at which the retractable tool portion is retracted is different than an angle between a tangent plane to the retractable tool surface and a horizontal plane, the one or more channels being defined by the first mold section and the first molded part, the one or more channels providing access to an isolated region;
   combining a third mold section with the first mold section to form a second mold cavity, the second mold cavity being defined by the first molded part, exposed surfaces of the first molding surface, and the third molding surface; and
   injecting a second thermoplastic resin through the exposed channels defined by the first mold section and the first molded part into the second mold cavity at a sufficient temperature and pressure to fill the second mold cavity and form the over-molded part, the over-molded part being the second molded part attached to the first molded part.

2. The method of claim 1 wherein the first thermoplastic resin is a thermoplastic resin selected from the group consisting of homopolymers and copolymers of polyethylene, homopolymers and copolymers of polypropylene, polycarbonate, acrylonitrile butadiene styrene, mixed acrylonitrile butadiene styrene and polycarbonate, and combinations thereof.

3. The method of claim 1 wherein the second thermoplastic resin is selected from the group consisting of thermoplastic elastomers, styrene-ethylene-butylene-styrene elastomers, blocked copolymer thermoplastic elastomers, polyolefin-based elastomers, foamed thermoplastic elastomers, and combinations thereof.

4. The method of claim 1 wherein the one or more channels define a runner and gate system.

5. The method of claim 4 wherein the runner and gate system is such that the velocity of the second thermoplastic resin increased in the runner and gate system when compared to the velocity prior to entering the runner and gate system.

6. The method of claim 4 wherein the rate of heat loss of the second resin is reduced prior to entering the runner and gate system or while in the runner and gate system.

7. The method of claim 4 wherein the pressure at which the second resin is injected is increased when the second resin enters the runner and gate system.

8. The method of claim 4 wherein the one or more channels define a gate having length less than about 125 mm.

9. The method of claim 1 wherein the one or more channels define one or more openings for introducing the second thermoplastic resin into the one or more isolated areas.

10. The method of claim 1 wherein the step of retracting the retractable tool portion is timed.

* * * * *